US010653269B1

(12) United States Patent
Jamison et al.

(10) Patent No.: US 10,653,269 B1
(45) Date of Patent: May 19, 2020

(54) POT ASSEMBLY WITH MULTIPLE LEVELS OF VENTING

(71) Applicant: RENA WARE INTERNATIONAL, INC., Bellevue, WA (US)

(72) Inventors: Jay H. Jamison, Woodinville, WA (US); Michael C. Mossman, Bellevue, WA (US); Bryan S. Cabatic, Shoreline, WA (US); Blake R. Stancik, Mukilteo, WA (US); Gregory J. Martin, Seattle, WA (US); Aaron M. McDaniel, Seattle, WA (US); Mark Taylor, Seattle, WA (US)

( * ) Notice: Subject to any disclaimer, the term of this patent is extended or adjusted under 35 U.S.C. 154(b) by 0 days.

(21) Appl. No.: 15/942,523

(22) Filed: Mar. 31, 2018

(51) Int. Cl.
*A47J 27/08* (2006.01)
*A47J 36/38* (2006.01)
*A23L 5/10* (2016.01)
*A47J 36/06* (2006.01)

(52) U.S. Cl.
CPC .................. *A47J 36/38* (2013.01); *A23L 5/10* (2016.08); *A47J 36/06* (2013.01); *A23V 2002/00* (2013.01)

(58) Field of Classification Search
CPC ....... A47J 36/38; A47J 36/06; B65D 51/1672; B65D 51/1683
USPC ......... 220/580, 203.05, 203.06, 203.04, 202, 220/227, 231, 303, 366.1, 367.1, 373
See application file for complete search history.

(56) References Cited

U.S. PATENT DOCUMENTS

| 4,285,411 A * | 8/1981 | Hino .................... G01G 19/414 177/211 |
| 4,285,441 A * | 8/1981 | Ziskind ................... A47J 36/06 220/231 |
| 7,571,675 B1 * | 8/2009 | Cappadona .......... A47J 45/068 220/203.06 |
| 8,113,246 B2 * | 2/2012 | Hsieh ................. B65D 81/2038 141/197 |
| 2008/0223222 A1 * | 9/2008 | Palamara ................ A47J 27/09 99/337 |
| 2008/0290090 A1 * | 11/2008 | Kindler ............... A47J 27/0802 220/203.05 |
| 2009/0020539 A1 * | 1/2009 | Rhetat ................. A47J 27/0804 220/573.1 |
| 2014/0224810 A1 * | 8/2014 | Bar-Akiva ............ A47J 27/002 220/573.1 |
| 2014/0353316 A1 * | 12/2014 | Lin ........................ A47J 36/10 220/573.1 |

OTHER PUBLICATIONS

Rena Ware International, Nutri Stainless Steel Cookware Use & Care, 2016.

* cited by examiner

Primary Examiner — Robert Poon
(74) Attorney, Agent, or Firm — DWC Law Firm, P.S.

(57) ABSTRACT

In some embodiments, a cooking pot assembly includes a lid with a venting assembly. The venting assembly may include three different selectable modes, including a first mode for whistling venting, a second mode for non-whistling venting, and a third mode for non-venting. In some embodiments, the venting assembly is recessed into the lid. Also, the venting assembly may include a base portion that is secured within a recess portion of the lid to resist rotation, while a rotor of the venting assembly is mated with the base portion, but able to rotate relative to the base portion for use in selecting a venting mode.

12 Claims, 7 Drawing Sheets

POT ASSEMBLY WITH MULTIPLE LEVELS OF VENTING

BACKGROUND

1. Field of the Invention

The present invention relates to cooking ware, and more particularly to pot assemblies.

2. Description of Related Art

RENA WARE® International's Nutri √ cooking system (configured to support a "water-less" cooking method) provides a pot body and lid with a whistling vent setting and a closed setting without venting. The whistling vent setting can be used to support the "water-less" cooking method, wherein a user relies on moisture within the food being cooked to provide moisture in the cooking environment. In particular, a user can adjust a knob on the lid to set the lid on a whistling vent setting. During use, with the lid mated with a pot body, when steam begins to vent through the lid on whistling vent setting, it causes the whistling vent to generate an audible whistle to alert the user to shut the vent. The user shuts the vent because the audible venting indicates that a water seal has been formed (e.g., between the pot body and lid) along the lid of the cooking utensil sufficient to seal the lid to assist in steam cooking the interior contents of the pot.

SUMMARY

In some embodiments, a pot assembly comprises a lid having a venting assembly disposed in a recessed chamber of the lid. The venting assembly includes a rotor component that is configured to be at least partially rotatable around a vertical axis of the venting assembly to at least three different positions including at least two positions for providing at least two different levels of venting for an interior space of the pot assembly when the lid encloses the interior space. The at least three different positions include a first position for a first level of venting through a first aperture, a second position for a second level of venting through a second aperture, and a third position for preventing venting through the first and second apertures, the second level of venting being greater than the first level of venting.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about," "approximately," and "substantially" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

According to various embodiments of the present disclosure, a pot assembly is disclosed that enables different levels (or types) of venting by employing a venting assembly in a pot lid of the pot assembly that may provide different levels of venting or non-venting and that may be largely integrated into the pot lid (hereinafter "lid assembly"). The pot assembly may include a pot body having an interior space and a lid assembly configured to enclose the interior space of the pot body and that includes a venting assembly that has several selectable vent settings. The three different settings may be for providing three different levels of venting or non-venting of the interior space of the pot body including a first setting for providing a whistling venting channel for whistling venting (e.g., venting that causes audible whistling), a second setting for providing non-whistling (or less audible) venting channel where the non-whistling venting channel provides greater venting in some embodiments, (e.g., venting through a wider or less constricted venting channel) than the whistling venting channel, and a third setting for providing no venting of the interior space of the pot body via the venting assembly. In various embodiments, the venting assembly may be disposed substantially within the body of the pot lid to provide a compact and aesthetic pot lid with dynamic venting functionalities.

Figure 1:
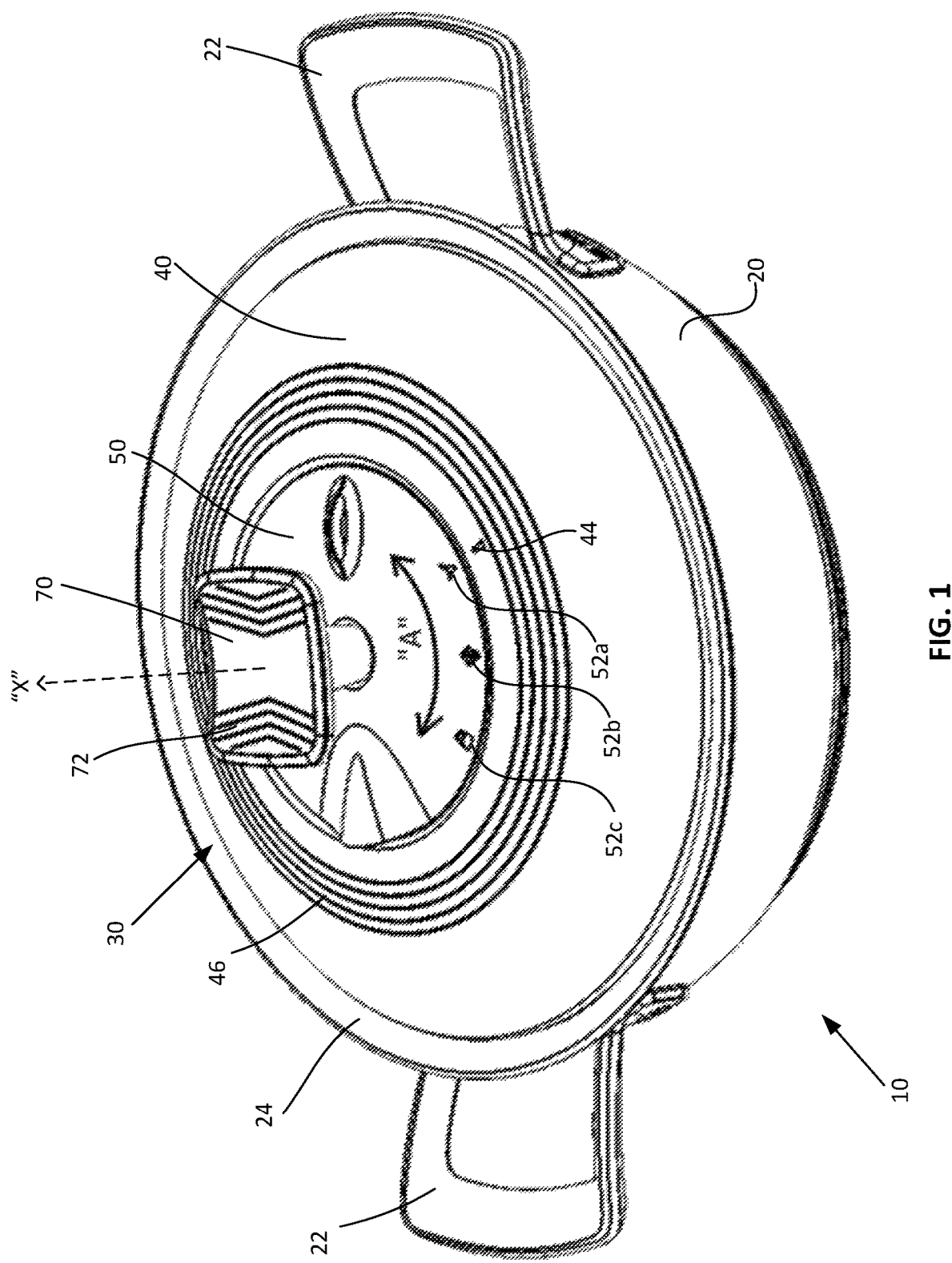
FIG. 1 is a perspective view of an example pot assembly of the present disclosure, including a lid assembly.

FIG. 1 is a perspective view of an example pot assembly 10 according to various embodiments of the present disclosure. As illustrated, the pot assembly 10 includes a pot body 20 and a lid assembly 30, the pot body 20 having an interior space (not shown) and a pair of pot handles 22. The pot body 20 may include a perimeter lip portion 24 that may extend laterally and outwardly away from the opening of the interior space of the pot body 20. In some cases, the lid assembly 30, when enclosing the interior space of the pot body 20, may be placed or disposed on top of and within the outer edges of the perimeter lip portion 24 of the pot body 20. In various embodiments, the lid assembly 30 may be held in place within and proximate the perimeter lip portion 24 of the pot body 20 by the gravitational forces of its own weight.

Figure 2:
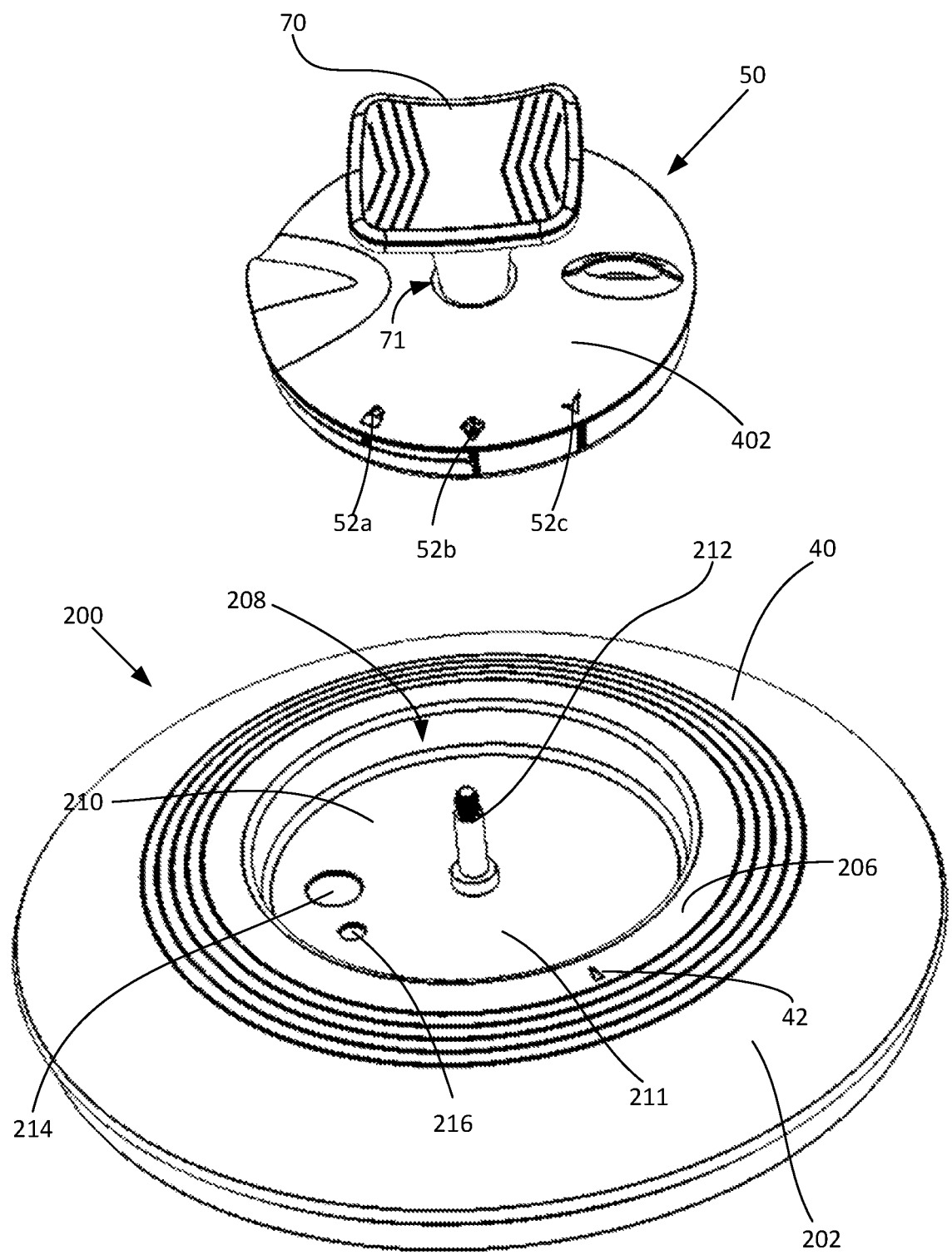
FIG. 2 shows a perspective view of a lid body separately from the venting assembly and the knob of the lid assembly of FIG. 1.

In various embodiments, the lid assembly 30 may include a lid body 40, a venting assembly 50, and a knob 70 as further illustrated in FIG. 2. As will be further described herein, at least a portion of the venting assembly 50 including the top portion (see the cover plate 402 and the rotor component 404 of the venting assembly 50 of FIG. 4) of the venting assembly 50 may be rotatable (as indicated by "A") around a vertical center axis "X" of the lid assembly 30. In alternative embodiments, however, the venting assembly 50 may not be centered at the vertical center axis X of the lid assembly 30 but instead may be offset from the vertical center axis X of the lid assembly 30. In such configurations, the top portion of the venting assembly 50 may be rotatable around an axis that is offset from the vertical center axis X of the lid assembly 30.

Figure 4:
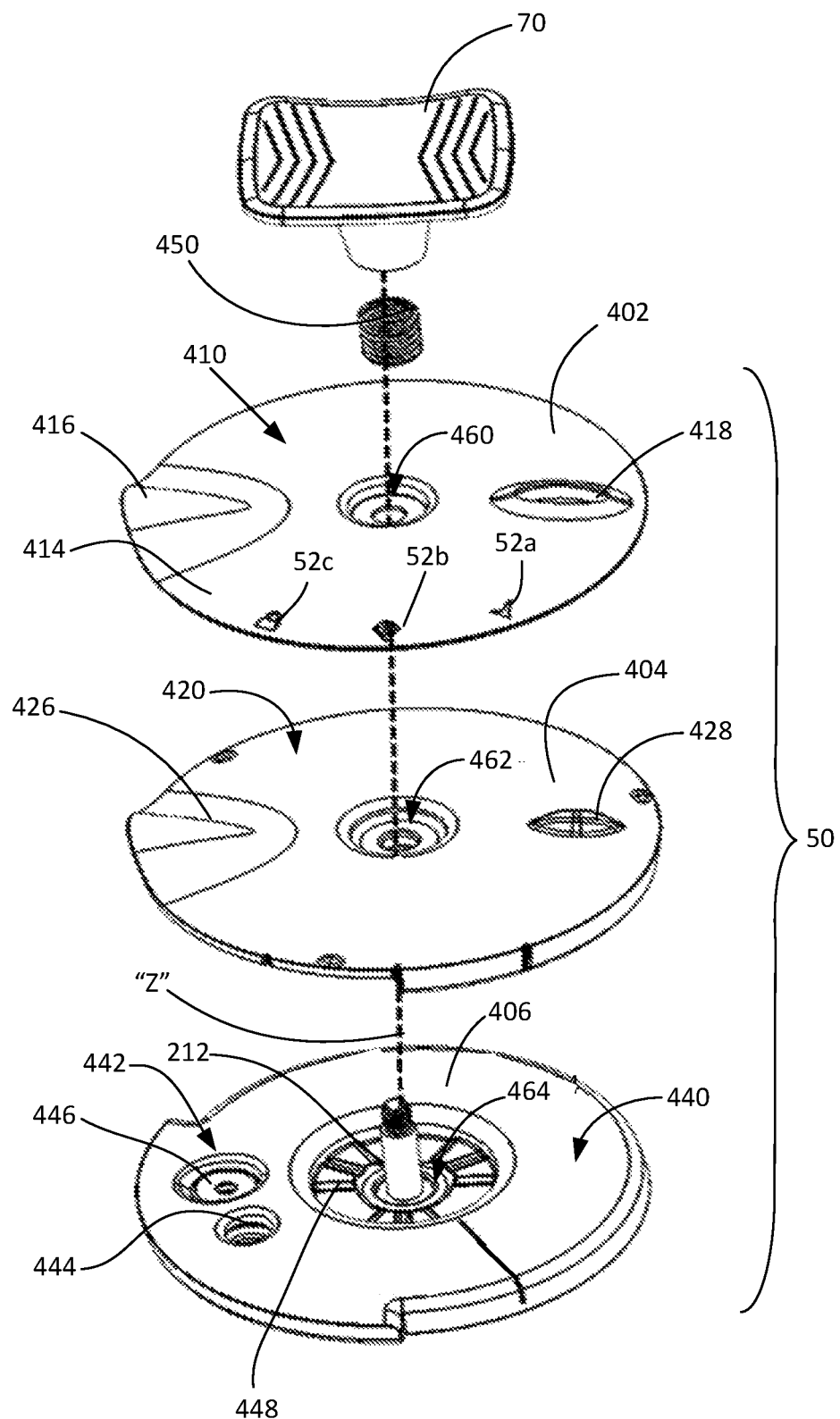
FIG. 4 is an exploded perspective view of the venting assembly of FIGS. 1 and 2.

By rotating at least the top portion of the venting assembly 50 (see the cover plate 402 and the rotor component 404 of the venting assembly 50 as illustrated in FIG. 4 that may be rotatable relative to the base plate 406 of the venting assembly 50), the venting assembly 50 may be selectably adjusted between three different settings including at least two settings for providing at least two levels of venting for the interior space of the pot body 20 when the lid assembly 30 encloses the interior space of the pot body 20. The three different settings include a first setting for a first level of venting for the interior space of the pot body 20, a second setting for a second level of venting for the interior space of the pot body 20 where the second level of venting is greater than the first level of venting, or otherwise provides less flow restriction, and a third setting for preventing venting through the venting assembly 50.

Disposed on the lid body 40 is a vent setting pointer icon 44 and ornamental markings 46 that are optional and that encircle the venting assembly 50, which is largely disposed in a recessed chamber 208 (see FIG. 2) of the lid body 40. The top of the knob 70 may also include optional ornamental marks 72. As further illustrated in FIG. 1, disposed on the top of the venting assembly 50 are three vent setting (or vent level) icons 52a, 52b, and 52c to provide indication of the selected vent level setting of the venting assembly 50. For example, if the top portion of the venting assembly 50 is rotated relative to the lid body 40 such that that icon 52a aligns with the venting setting pointer icon 44 then the venting assembly 50 is in the first setting for providing the first level of venting (e.g., whistling venting). If, on the other hand the top portion of the venting assembly 50 is rotated such that the icon 52b aligns with the venting setting pointer icon 44 then the venting assembly 50 is in the second setting for providing the second level of venting (e.g., level of venting that is greater than the first level of venting). Finally, if the top portion of the venting assembly 50 is rotated such that icon 52c aligns with the venting setting pointer icon 44 then the venting assembly 50 is in the third setting that restricts venting through the venting assembly 50

Note that in the embodiment illustrated in FIG. 1, the vertical axis "Z" (see FIG. 4) of the venting assembly 50 aligns with the vertical center axis X of the lid assembly 30. However, in some alternative embodiments, the vertical axis Z of the venting assembly 50 may not align with the vertical center axis X of the lid assembly 30 and may, in fact, be offset from vertical center axis X. Note also that for purposes of this description, references to "upward," "vertical," "exterior", "interior," "inward," "outward," and so forth will be from the perspective of the interior space of the pot body 20 when the pot assembly 10 is sitting upright unless indicated otherwise.

FIG. 2 shows the lid body 40 separated from the venting assembly 50 and the knob 70 of the lid assembly 30 of FIG. 1. As will be further described in relation to FIG. 4, in various embodiments, the venting assembly 50 may comprise a cover plate 402, a rotor component 404, and a base plate 406 that when combined or stacked together may be configurable to provide the different levels of venting or non-venting as previously described. Disposed on a top-side 410 of the cover plate 402 is a perimeter surface portion 414 (see FIG. 4) of the top surface of the cover plate 402 where icons 52a, 52b, and 52c are disposed.

Figure 3:
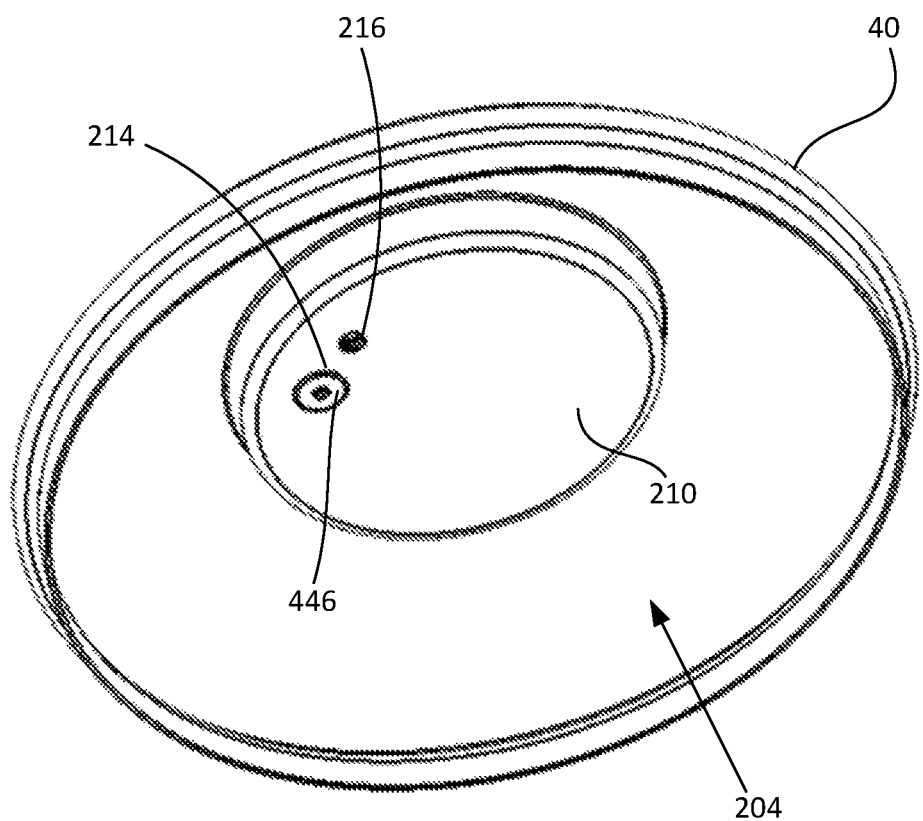
FIG. 3 shows perspective view of an interior-side of the lid body of FIG. 1.

In various embodiments, the lid body 40 may have an exterior-side 200 and an interior-side 204 (see FIG. 3 and FIG. 2). The exterior-side 200 of the lid body 40 may include an outermost exterior surface 202 that surrounds a recessed chamber 208 that extend inwards (e.g., downward relative to FIG. 2) from the outermost exterior surface 202. Surrounding the recess chamber 208 may be a recess perimeter surface 206 where the venting setting pointer icon 42 may be disposed. In various embodiments, located at the bottom of the recessed chamber 208 is a bottom recessed wall 210.

As illustrated, the bottom recessed wall 210 having a first aperture 214 and a second aperture 216, and a pin member 212 protruding upward from the bottom recess wall 210. In various embodiments, the knob 70 may be attached or screwed onto the pin member 212 through a center opening 71 (e.g., openings 460, 462, and 464 of FIG. 4) of the venting assembly 50. More particularly, the pin member 212 may have a first end that is coupled to the bottom recessed wall 210 and a second end that is opposite to the first end. The venting assembly 50 may be disposed between the bottom recessed wall 210 and the knob 70, which may be coupled on the second end of the pin 212. A spring 450 (see FIG. 4) may be placed between the knob 70 (which has been removably coupled to the pin 212) and the venting assembly 50 urging the venting assembly 50 towards the bottom recessed wall 210.

In various embodiments, the venting assembly 50 may be inserted into the recessed chamber 208 of the lid body 40 such that at least a large or substantial portion of the venting assembly 50 is disposed within the recessed chamber 208. For example, in some embodiments, when the venting assembly 50 is fully inserted into the recessed chamber 208 (such as shown in FIG. 1), a highest point on the top-side 410 of the cover plate 402 is level with, or does not extend more than ½, 1, 2 or 3, centimeters (cm) above a highest point on the recess perimeter surface 206 of the lid body 40 (relative to a vertically extending axis, such as, for example, axis X in FIG. 1, assuming axis X extends upward in perpendicular fashion relative to a horizontal surface on which the pot assembly 10 rests).

FIG. 3 shows the interior-side 204 of the lid body 40 when the venting assembly 50 has been fully inserted into the recessed chamber 208 of the lid body 40. As illustrated, apertures a provided on the bottom recess wall 210 of the lid body 40 extending therethrough, namely, a first aperture 214 and the second aperture 216. Protruding out of the first aperture 214 is part of a whistling mechanism structure 446, which may be coupled to the base plate 406 (see FIG. 4) of the venting assembly 50. As a result, in part, of the whistling mechanism structure 446 being partially inserted through the first aperture 214, the base plate 406 of the venting assembly 50 may be radially and circumferentially secured to the upward facing surface 211 of the bottom recess wall 210.

FIG. 4 is an exploded view of the venting assembly 50 of FIGS. 1 and 2 according to various embodiments. FIG. 4 further illustrates the knob 70 of FIGS. 1 and 2 as well as a spring 450, which may be used in combination with the knob 70 to urge the venting assembly 50 towards the upward facing surface 211 of the lid body 40 when the venting assembly 50 has been inserted into the recessed chamber 208 and the knob 70 has been screwed onto the pin 212. As illustrated, the venting assembly 50 may include, inter alia, a cover plate 402, a rotor component 404, and a base plate 406.

The cover plate 402 includes a cover plate top-side 410 and a cover plate bottom-side 412 (see FIG. 5A) opposite of top-side 410. Disposed on the perimeter surface portion 414 of the cover plate 402 are the three icons 52a, 52b, and 52c for indicating different levels of venting or non-venting (e.g., whistling venting 52a, non-whistling venting 52b (e.g., less audible and/or less throttled), or non-venting 52c). In various embodiments, the bottom-side 412 of the cover plate 403 may be contoured to inversely approximately mirror, or to otherwise snugly receive, the contours of the rotor top-side 420 of the rotor component 404 so that the bottom-side 412 of the cover plate 402 will fit snugly on the top-side 420 of the rotor component 404. For example, the cover plate 402 includes a cover canopy portion 416 and a cover grip portion 418 that fit snugly over the canopy portion 426 and the grip portion 428 of the rotor component 404.

The rotor component 404 has, in addition to the rotor top-side 420, a rotor bottom-side 422 (see FIG. 5B) that is opposite of the top-side 420 of the rotor component 404. In various embodiments, the rotor component 404 is designed to rotatably couple to the top-side 440 of the base plate 406. More particularly, when the rotor component 404 is stacked on top of the base plate 406 the bottom-side 422 of the rotor component 404 may be rotatably mounted onto the top-side 440 of the base plate 440.

The base plate 406 includes a whistling mechanism aperture 442 and a venting aperture 444 that penetrates from the top-side 440 to the bottom-side 442 of the base plate 406. Disposed in the whistling mechanism aperture 442 is a whistling mechanism structure 446 that is configured to generate an audible whistling sound when pressurized gas such as water vapor is forced through the whistling mechanism structure 446. General whistling mechanisms are well-known in the relevant art will be appreciated by those skilled in the art after reviewing this disclosure, and so will not be further described herein insofar as the acoustic effects thereof are relevant.

In various embodiments, the bottom-side 442 of the base plate 406 may be designed to mate with the bottom recessed wall 210 of the lid body 40. For these embodiments, the base plate 406 may be at least rotationally secured or fixed (e.g., will not rotate) to the bottom recess wall 211 of the lid body 40 when the whistling mechanism structure 446 is aligned with or over the first aperture 214 of the lid body 40, and may protrude slightly through the first aperture, and the base plate 406 is biased against the bottom recessed wall 210 of the lid body. For example, in order to be radially/rotationally secured to the bottom recess wall 210 a portion of the whistling mechanism structure 446 that protrudes out of the bottom-side 442 (see FIG. 5C) of the base plate 406 may be inserted into the first aperture 214 of the recessed chamber 208 of the lid body 40. This is further illustrated in FIG. 3 showing a portion of the whistling mechanism structure 446 protruding out of the interior-side 204 of the lid body 40.

Located at the center portions of each of the cover plate 402, the rotor component 404, and the base plate 406 are openings 460, 462, and 464. In FIG. 4, pin 212 of the recessed chamber 208 of the lid body 40 is shown protruding through opening 464 of the base plate 406. When the components (e.g., cover plate 402, rotor component 404, and base plate 406) of the venting assembly 50 are stacked and inserted into the recess chamber 208 of the lid body 40, the pin 212 may be inserted through openings 460, 462, and 464 of the cover plate 402, the rotor component 404, and the base plate 406, respectively.

In various embodiments, when the lid assembly 30 covers or encloses the interior space of the pot body 20, a user may selectively manipulate the venting assembly 50 to provide different levels of venting or non-venting of the interior space by rotating the cover plate 402 around vertical axis Z of the venting assembly 50 so that the venting assembly 50 is in a whistling venting mode, is in a non-whistling venting mode, or is in a non-venting mode. More particularly, when a user rotates the cover plate 402 by, for example, radially pulling or pushing the cover grip portion 418 or the cover canopy portion 416 of the cover plate 402, which is snugly mated to the top-side 420 of the rotor component 404, the rotor component 404 will likewise rotate relative to the base plate 406 (which is radially/rotationally fixed to the bottom recess wall 210 of the recess chamber 208, while the rotor component and cover plate are selectively rotatable). By rotating the rotor component 404 relative to the base plate 406, the canopy portion 426 may be positioned over different portions of the base plate 406 to provide different levels of venting or non-venting.

For example, if the rotor component 404 is rotated such that the canopy portion 426 is positioned over the whistling mechanism structure 446 of the base plate 406 then the venting assembly 50 will be positioned to provide a channel for whistling venting through the whistling mechanism structure 446 and via the first aperture 214 of the lid body 40, and in addition, icon 52a will be aligned with pointer icon 44 for visual indication of the venting selection of whistling. In contrast, if the rotor component 404 is rotated such that the canopy portion 426 is positioned over the venting aperture 444 of the base plate 406 then the venting assembly 50 will be configured to provide a channel for non-whistling venting through the venting aperture 444 and via the second aperture 216 of the lid body 40, and in addition, icon 52b will be aligned with pointer icon 44 for visual indication of the venting selection of non-whistling. In various embodiments, non-whistling venting through venting aperture 444 may be venting that is greater (lower back pressure, or less restrictive) than the whistling venting through the whistling mechanism structure 446. That is, the venting channel (e.g., whistling venting) through the whistling mechanism structure 446 may be more constricted than the venting channel through the venting aperture 444.

If, on the other hand, the rotor component 404 is rotated such that the canopy portion 426 is not position over the whistling mechanism structure 446 or the venting aperture 444 of the base plate 406, and in addition, icon 52c is aligned with the pointer icon providing visual indication of a non-venting selection, and rather positioned over other portions of the top-side 420 of the rotor component 404 then the venting assembly 50 may be configured to provide no channel for venting. Although the example venting assembly 50 of FIG. 4 provides only two levels of venting, in other embodiments, more than two levels of venting may be provided by providing additional venting channels that provide greater or lesser venting, or even venting of different audible sounds.

In some alternative embodiments, the venting assembly 50 may not include the cover plate 402 and/or the base plate 406. That is, those of ordinary skill in the relevant art will recognize that it may be possible to integrate these components or their functionalities into the other components of the lid assembly 30. For example, in some cases, the cover plate 402, or at least the features thereof, may be integrated into the rotor component 404. Similarly, the base plate 406, or at least its functionalities may be integrated into the bottom of the recessed chamber.

Figure 5A:
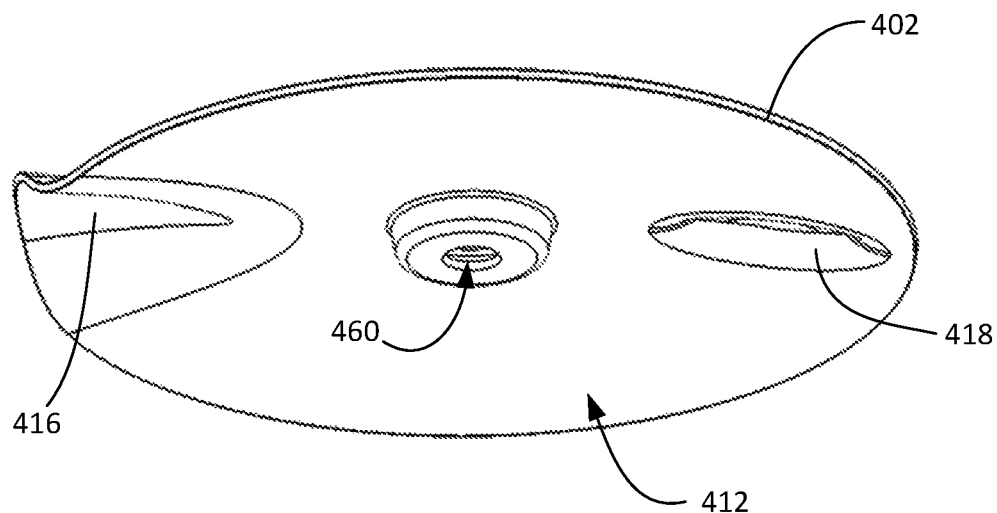
FIG. 5A is a perspective view showing a bottom-side of the cover plate of FIG. 4.
Figure 5B:
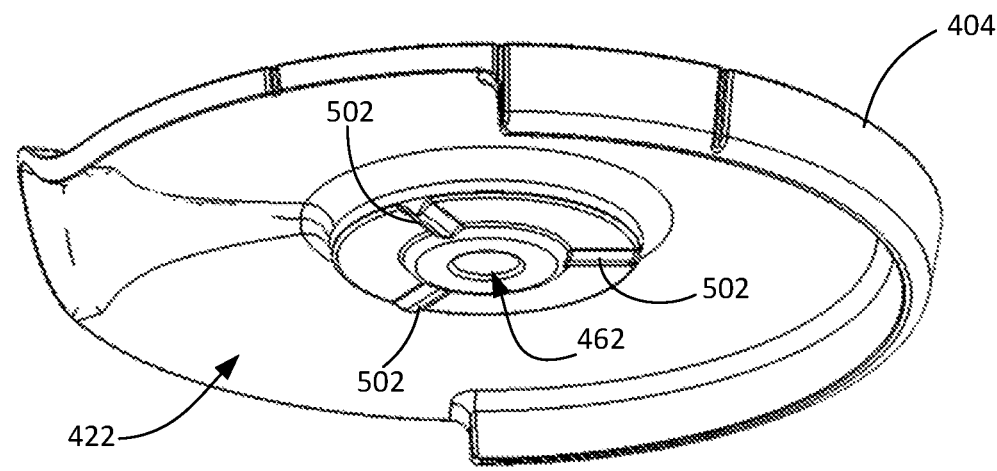
FIG. 5B is a perspective view showing a bottom-side of the rotor component of FIG. 4.

FIG. 5A illustrates the bottom-side 412 of the cover plate 402 including the undersides of the cover canopy portion 416 and the cover grip portion 418. FIG. 5A also shows opening 460 through which pin 212 may be inserted through. FIG. 5B illustrates the bottom-side 422 of the rotor component 404. As shown, at the center of the bottom-side 422 is opening 462 for inserting the pin 212 through. On the bottom-side 422 are a plurality of ribs 502 that are designed to engage with receiving ribs 464 of the base plate 406 to facilitate an end user to rotate and position the rotor component 404 to any one of at least three different positions relative to the base plate 406 and that corresponds to the three different venting assembly configurations (e.g., whistling venting configuration, non-whistling-venting configuration, and non-venting configuration) previously described.

Figure 5C:
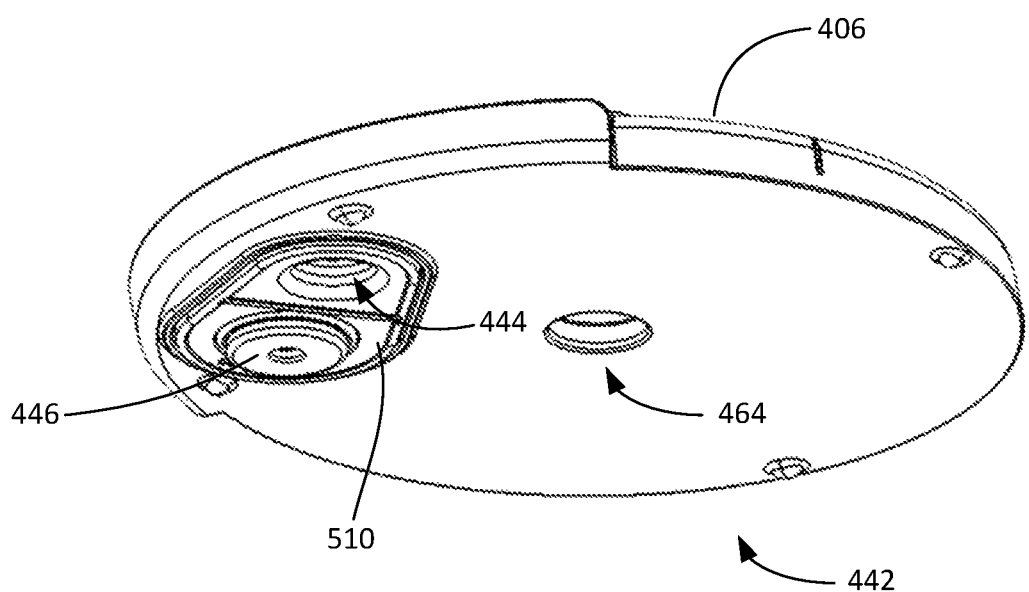
FIG. 5C is a perspective view showing a bottom-side of the base plate of FIG. 4.
Figure 5D:
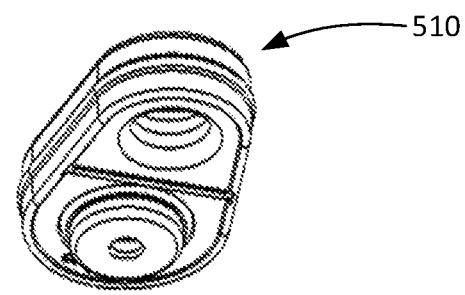
FIG. 5D is a perspective view of the base plate aperture assembly of FIG. 5C.

FIG. 5C illustrates the bottom-side 442 of the base plate 406. As shown, at the center of the bottom-side 442 is opening 464 for inserting the pin 212 through. Inserted into, and coupled partially within, the bottom-side 442 is a baseplate aperture assembly 510, which includes part of the venting aperture 444 and the whistling mechanism structure 446. FIG. 5D shows the base plate aperture assembly 510 separately from the body of the base plate 406.

Figure 6:
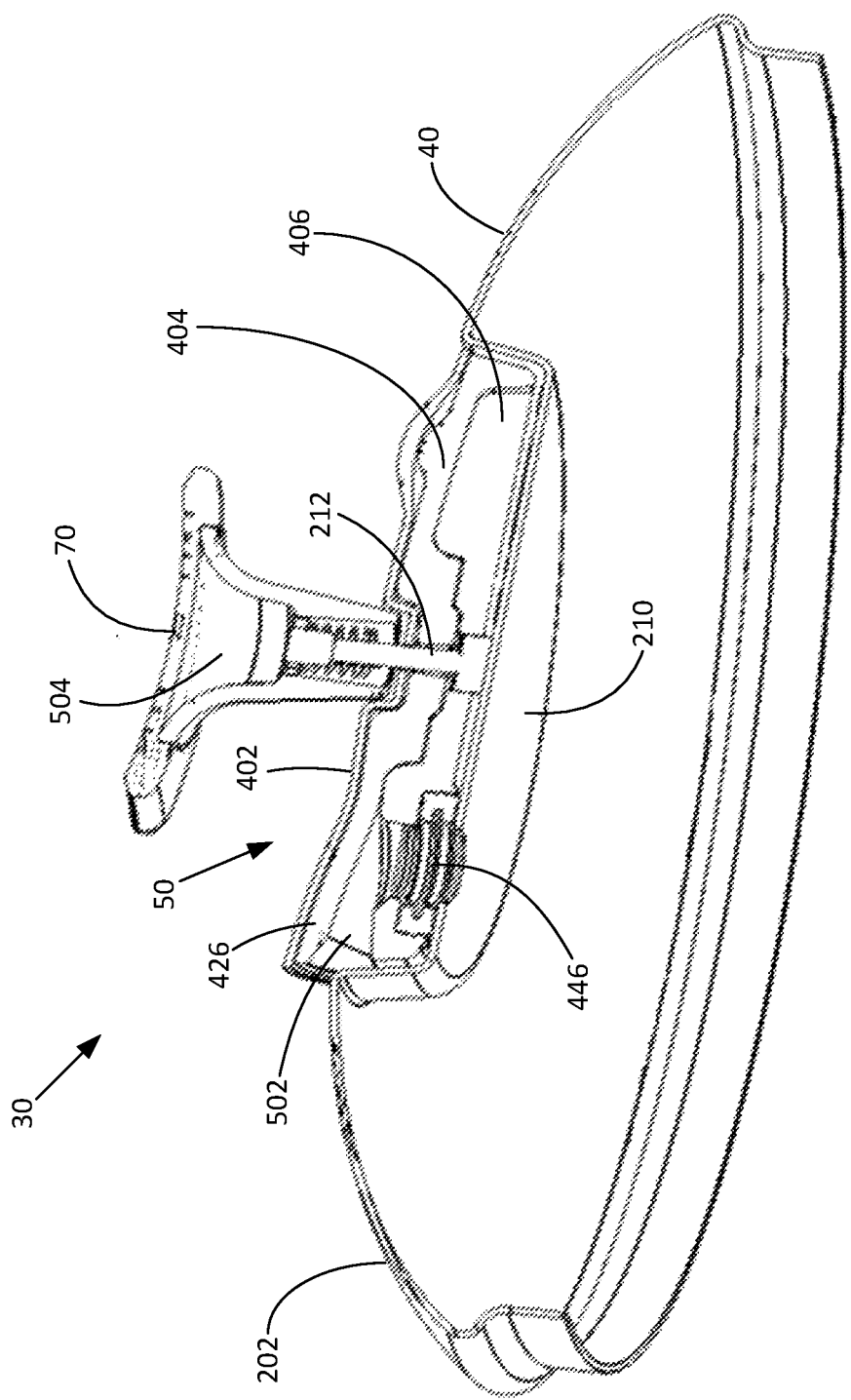
FIG. 6 is a cross sectional perspective view of the lid assembly of FIG. 4 when the lid assembly is in a whistling venting configuration

FIG. 6 is a cross sectional perspective view of the lid assembly 30 when the lid assembly 30 is in a whistling venting configuration. More particularly, when the lid assembly 30 is in a whistling venting configuration, the canopy portion 426 of the rotor component 404 and a rotor venting channel 502 that is partly formed by the canopy portion 426 will be positioned over the whistling mechanism structure 446. As shown in FIG. 6, the whistling mechanism structure 446 slightly protrudes through the bottom recess wall 210.

Still referring to FIG. 6, in various embodiments, disposed within the knob 70 is a knob void 504 that prevents excessive heat transferring from the lid assembly 30 to the top portion of the knob 70.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A pot assembly, comprising:
a pot body having an interior space;
a lid body configured to enclose the interior space of the pot body, the lid body having an interior-side that faces the interior space of the pot body when the lid body encloses the interior space of the pot body, and an exterior-side opposite of the interior-side, the exterior-side including an outermost exterior surface surrounding a recessed chamber that extend inwards from the outermost exterior surface, the recessed chamber having a bottom recessed wall with a first aperture and a second aperture formed through the bottom recessed wall;
a venting assembly disposed in the recessed chamber, the venting assembly including a rotor component that is configured to be at least partially rotatable around a vertical axis of the venting assembly to at least three different positions including at least two positions for providing at least two levels of venting for the interior space of the pot body when the lid body encloses the interior space of the pot body, the at least three different positions including a first position for a first level of venting through the first aperture, a second position for a second level of venting through the second aperture, and a third position for preventing venting through the first and second apertures, the second level of venting being greater than the first level of venting; and
wherein the venting assembly includes a base plate disposed between the rotor component and the bottom recessed wall, the base plate having a top-side and a bottom-side opposite of the top-side, the bottom-side of the base plate being configured to mate with the bottom recessed wall, and further comprising a whistling mechanism structure disposed in the base plate, the base plate being configured to be circumferentially fixed relative to the bottom recessed wall when the whistling mechanism structure is aligned with the first aperture and the base plate is biased against the bottom recessed wall.

2. The pot assembly of claim 1, wherein the whistling mechanism structure is disposed at least partially in the first aperture.

3. The pot assembly of claim 1, wherein the whistling mechanism structure at least partly protrudes out of the bottom-side of the base plate and is partially disposed into the first aperture of the lid body.

4. The pot assembly of claim 1, wherein the base plate includes a venting aperture that extends from the top-side to the bottom-side of the base plate, the venting aperture being positioned in the base plate such that when the whistling mechanism structure is aligned with the first aperture the venting aperture is aligned with the second aperture of the lid body.

5. The pot assembly of claim 1, wherein the rotor component having a rotor top-side and a rotor bottom-side opposite of the rotor top-side, the rotor bottom-side configured to rotatably mate with the top-side of the base plate, the rotor bottom-side including one or more ribs that are configured to engage with one or more receiving ribs on the top-side of the base plate to facilitate an end user to rotate and position the rotor component to any one of the at least three different positions.

6. The pot assembly of claim 5, wherein the rotor component has a canopy portion that provides a channel for venting via the first aperture or the second aperture of the lid body when the rotor component is rotated to the first position or the second position.

7. The pot assembly of claim 6, wherein when the rotor component is rotated to the third position the canopy portion is positioned within the recessed chamber such that no venting channel exists through the canopy portion either through the first aperture or the second aperture.

8. The pot assembly of claim 6, wherein the venting assembly further includes a cover plate configured to mate to the rotor top-side, the cover plate having a cover plate top-side and a cover plate bottom-side opposite of the cover plate top-side, the cover plate bottom-side having a contoured surface that mirrors a contoured surface of the rotor top-side including contoured surface of the canopy portion and a grip portion of the rotor component.

9. The pot assembly of claim 8, wherein the outermost exterior surface of the lid body includes a recess perimeter surface that includes a venting setting pointer icon, and wherein the cover plate top-side having a cover top-side surface including perimeter surface portion, the perimeter surface portion having disposed thereon an icon for indicating whistle venting, an icon for non-whistling venting, and an icon for no venting that when used in conjunction with the venting setting pointer icon provides an indication of the venting configuration of the pot assembly.

10. The pot assembly of claim 1, wherein the vertical axis of the venting assembly is the same as a center vertical axis of the lid body.

11. The pot assembly of claim 1, wherein the venting assembly does not vertically protrude more than three (3) centimeters above the outermost exterior surface.

12. A pot assembly, comprising:
a pot body having an interior space;
a lid body configured to enclose the interior space of the pot body, the lid body having an interior-side that faces the interior space of the pot body when the lid body encloses the interior space of the pot body, and an exterior-side opposite of the interior-side, the exterior-side including an outermost exterior surface surrounding a recessed chamber that extend inwards from the outermost exterior surface, the recessed chamber having a bottom recessed wall with a first aperture and a second aperture formed through the bottom recessed wall;
a venting assembly disposed in the recessed chamber, the venting assembly including a rotor component that is configured to be at least partially rotatable around a vertical axis of the venting assembly to at least three different positions including at least two positions for providing at least two levels of venting for the interior space of the pot body when the lid body encloses the interior space of the pot body, the at least three different positions including a first position for a first level of venting through the first aperture, a second position for a second level of venting through the second aperture, and a third position for preventing venting through the first and second apertures, the second level of venting being greater than the first level of venting;
wherein the lid body further includes a pin that protrudes upwards from the bottom recessed wall, the pin being inserted through the venting assembly including through the vertical axis of the venting assembly such that the rotor component is at least partially rotatable around the pin;
wherein the pin has a first end that is coupled to the bottom recessed wall and a second end opposite of the first end, with the venting assembly being disposed between the bottom recessed wall and a knob inserted on the second end of the pin; and
a spring disposed between the knob and the venting assembly urging the venting assembly towards the bottom recessed wall.

\* \* \* \* \*